March 31, 1942.    R. F. GOLDEN    2,277,852
SCREW AND LOCK WASHER ASSEMBLY
Filed Oct. 11, 1939
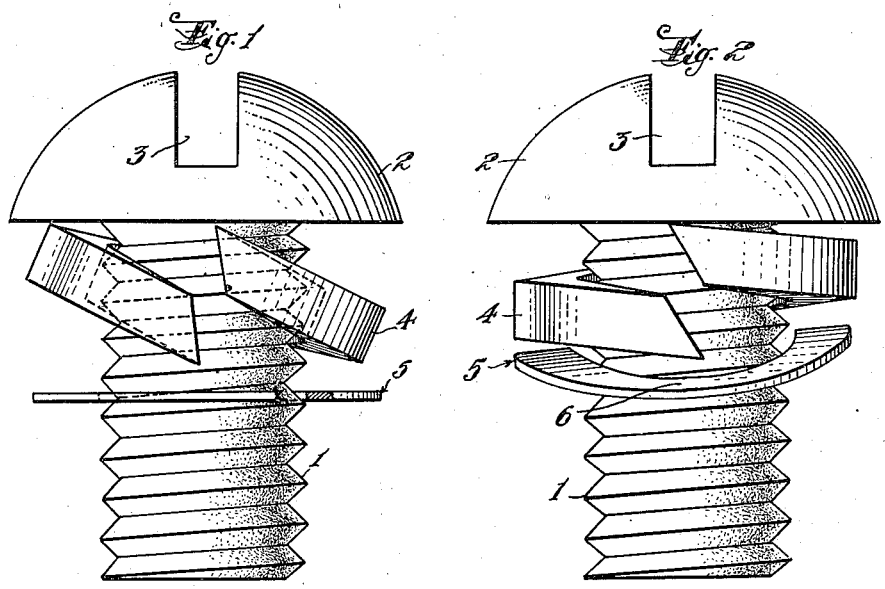
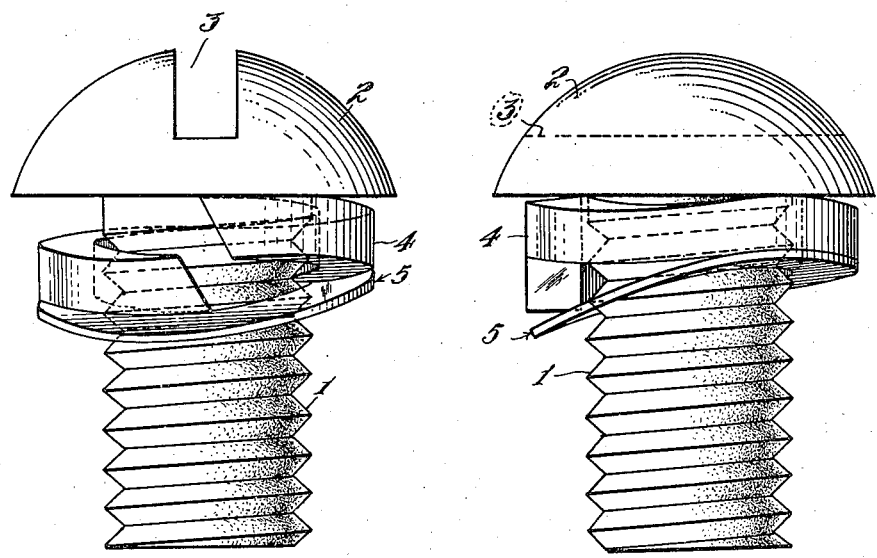
INVENTOR
Robert F. Golden
BY A. D. T. Libby
ATTORNEY Patented Mar. 31, 1942

2,277,852

UNITED STATES PATENT OFFICE 2,277,852

SCREW AND LOCK WASHER ASSEMBLY

Robert F. Golden, South Orange, N. J., assignor to The National Lock Washer Company, Newark, N. J.

Application October 11, 1939, Serial No. 299,029

6 Claims. (Cl. 151—32)

This invention relates to means for assembling and holding lock or spring washers, as they are sometimes termed, on a threaded fastener which may be in the form of a screw or screw bolt.

The number of spring washers or lock washers used each year runs into billions, and a large percentage of this number is used in places where the time required to make assemblies is considered as an important factor in the cost of their production. In most cases it is considered worth while to eliminate the time required to manually assemble spring washers with screws or bolts. Also, it is considered worth while to eliminate the loss of spring or lock washers dropped on assembly floors when manually assembling either of these devices with screws or bolts, especially when workers are on a piece-work basis.

It has heretofore been proposed to assemble washers, including lock or spring washers of various kinds and shapes (only one type being shown on the accompanying drawing) onto the unthreaded stem of a screw and then roll a thread thereon, so the thread will then hold the lock washer on the screw stem. Some users of lock washers prefer to buy the screws or bolts, all threaded, and then assemble them by slipping the washers over the threaded fasteners prior to using them in the assembly lines. While a large percentage of lock washers will stay on the threaded fasteners through subsequent handling and movement through the assembly lines, many will fall off and thus cause a certain loss of time.

To overcome this last-mentioned objection and at the same time compete with the cost of assembling by hand the threaded fasteners and lock washers, I have devised a process which produces an assembled unit comprising a screw or screw bolt and spring or lock washer in position thereon, ready for use.

My invention will be readily understood by reference to the annexed drawing, wherein:

Figure 1 is an enlarged view of a small screw with the lock washer, to which I have applied my invention, with the parts shown in an initial stage of assembly.

Figure 2 is a view similar to Figure 1, but with the parts in the final stage of assembly.

Figure 3 is an enlarged view of a modified form of assembly.

Figure 4 is a view of Figure 3 taken at right angles thereto.

In the different views, 1 is the stem of a threaded screw fastener having a head 2 with a slot 3 therein. The threads on the stem 1 may be cut or rolled thereon. In the form of assembly shown in Figures 1 and 2, the lock or spring washer 4 is first placed on the stem of the screw next to the head 2. A relatively thin, normally flat washer 5 is then applied to the screw stem, as shown in Figure 1. After the lock washer 4 and the washer 5 have been moved onto the stem to a point closely adjacent the head 2, the washer 5 is bent or deformed by a suitable tool so that at least some part of the material forming the hole of the washer 5 will engage at least one of the threads on the stem 1.

As shown in Figure 2, opposite portions 6 of the washer 5 are bent downwardly, which acts to crimp the material around the hole so that part of it will engage the threads on the stem of the fastener. While the opposite sides 6 of the washer 5 may be bent downwardly, they may be bent upwardly, or one may be bent down and the other up. It is immaterial how the washer 5 is bent or deformed, so long as at least one diameter of the hole is shortened to produce the engaging effect described.

The washer 5 may be made of any satisfactory material but should have sufficient stiffness to bring about the desired engaging result, with the threads of the screw. This engagement is such as to offer no noticeable interference with the setting up of the screw in a hole against the lock washer 4, as the force which the lock washer 4 applies to the relatively thin washer 5 is such as to readily flatten it out or cause it to realign itself on the screw stem into conformity with the lock washer 4.

In Figures 3 and 4, after the spring washer 4 and thin holding washer 5 are assembled over the screw stem 1, force or pressure is applied to the outer surface of the washer 5, forcing it against the lock washer 4 and compressing the same a certain amount. The force is then released and the lock washer 4 will cause the thin washer 5 to tilt or bend, or both, so it will engage the thread on the stem and be held in this position by the spring washer, so that, in effect, the spring washer supplies its own power for holding itself on the screw stem. In this form of assembled unit, I have found it desirable to use a thinner washer 5 than need be used in the assembly shown in Figure 2, although this is not absolutely necessary.

Since the washers 5 are made of thin stock, the cost of the material is very low and they can be punched at great speed on a multiple die, and the assembly operation can be quickly and economically carried out, by automatic assembly apparatus.

What I claim is:

1. A screw and lock washer assembly including; a screw having a head and threaded stem, a spring lock washer positioned on the stem next to the head, and a thin normally flat washer on the stem between its end and the spring lock washer, the thin washer having a hole normally of uniform diameter and being deformed from a flat plane after being placed on the stem adjacent the spring lock washer so it engages threads on the stem sufficiently to prevent itself and the spring lock washer from falling off in handling, the thin washer having a thickness which will allow it to be flattened out and freed from engagement with the stem thread when the screw is set up, thereby allowing the spring lock washer to act freely and independently of the thin washer.

2. A screw and lock washer assembly including; a screw having a head and threaded stem, a spring lock washer positioned on the stem next to the head, and a normally flat washer having a clearance hole for easy application onto the stem adjacent the spring lock washer and bent thereafter so the metal around the hole in the normally flat washer engages at least one thread on the screw stem for the purpose described, but is freed from the stem when pressure is applied to the bent washer through the spring lock washer, thereby allowing the spring lock washer to act without interference on setting up the screw.

3. A screw and lock washer assembly including; a screw having a head and threaded stem, a spring lock washer positioned on the stem next to the head, and a normally flat washer having a thickness such as will not interfere with the action of the lock washer and the setting up of the screw, the washer being positioned on the stem adjacent the lock washer and bent by the lock washer per se so the metal around the hole of the washer engages at least one thread on the stem for the purpose described.

4. A screw and lock washer assembly including; a screw having a head and threaded stem, a spring lock washer positioned on the stem next to the head, and a thin flat holding washer outside the spring washer, the spring washer locking the holding washer onto the stem and the holding washer holding the spring washer in a locking position.

5. The method of assembling and holding a spring lock washer on a fastener having a head and threaded stem which consists in first placing a spring lock washer on the stem, then placing a relatively thin flat washer on the stem, compressing the spring washer by pressure applied through the flat washer, removing the pressure and allowing the stored energy in the spring washer to at least tilt the thin washer so that at least a part of the material around its hole will engage a thread on the stem of the fastener.

6. The method of assembling and holding a spring lock washer on a fastener having a head and threaded stem which consists in first placing a spring lock washer on the stem, then placing a relatively thin flat washer on the stem, applying pressure to the thin washer to cause it to compress the spring lock washer, then removing the force to allow the spring lock washer to expand and act on the thin washer so it will engage some threads on the fastener.

ROBERT F. GOLDEN.